United States Patent [19]

Jaekel et al.

[11] Patent Number: 5,419,846
[45] Date of Patent: May 30, 1995

[54] STABLE GRANULES FOR DETERGENTS, CLEANING AGENTS AND DISINFECTANTS

[75] Inventors: Frank Jaekel, Bad Soden, Germany; Gerd Reinhardt, Kelkheim, Germany; Gerhard Nöltner, Frankfurt am Main, Germany; Eric Jacquinot, Attichy, France; Rüdiger Funk, Wiesbaden, Germany; Manfred Müller, Gelnhausen, Germany

[73] Assignee: Hoechst AG, Frankfurt, Germany

[21] Appl. No.: 108,478

[22] Filed: Aug. 18, 1993

[30] Foreign Application Priority Data

Aug. 18, 1992 [DE] Germany ............ 42 27 277.7

[51] Int. Cl.$^6$ .................. C11D 3/37; C11D 17/00
[52] U.S. Cl. .......................... 252/95; 8/111; 252/99; 252/100; 252/101
[58] Field of Search ............ 252/95.99, 100; 8/111

[56] References Cited

U.S. PATENT DOCUMENTS

| | | | |
|---|---|---|---|
| 4,009,113 | 2/1977 | Green et al. ................. | 252/95 |
| 4,126,573 | 11/1978 | Johnston ..................... | 252/99 |
| 4,536,313 | 8/1985 | Hignett et al. ............... | 252/100 |
| 4,634,551 | 1/1987 | Burns et al. ................. | 252/102 |
| 4,681,592 | 7/1987 | Hardy et al. ................. | 8/111 |
| 4,795,594 | 1/1989 | Dankowski .................. | 260/502 R |
| 4,973,417 | 11/1990 | Falholt ........................ | 252/95 |

FOREIGN PATENT DOCUMENTS

| | | |
|---|---|---|
| 0124969 | 11/1984 | European Pat. Off. . |
| 0127782 | 12/1984 | European Pat. Off. . |
| 017036 | 2/1986 | European Pat. Off. . |
| 0272402 | 3/1991 | European Pat. Off. . |
| 2737864 | 3/1978 | Germany . |
| 3232635 | 3/1984 | Germany . |
| 3316513 | 11/1984 | Germany . |
| 3438529 | 4/1986 | Germany . |
| 3539036 | 5/1987 | Germany . |

*Primary Examiner*—Richard L. Raymond
*Attorney, Agent, or Firm*—Connolly and Hutz

[57] ABSTRACT

The present invention relates to stable granules comprising active substance, granulating auxiliary, enveloping substance and if appropriate additional components, wherein the enveloping substance in each case comprises a) silicon dioxide particles or
b) homopolymers of unsaturated sulfonic acids or
c) copolymers of unsaturated sulfonic acids and unsaturated carboxylic acids or
d) homopolymers of (meth)acrylic acid esters or
e) copolymers of (meth)acrylic acid esters and unsaturated carboxylic acids or
f) mixtures of one or more of these constituents.

26 Claims, No Drawings

STABLE GRANULES FOR DETERGENTS, CLEANING AGENTS AND DISINFECTANTS

DESCRIPTION

Stable granules for detergents, cleaning agents and disinfectants

Stability is an essential quality criterion of granules employed in the detergent industry sector.

Inorganic per-salts, such as perborates or percarbonates, have long been known as bleaching additives in detergents. However, they only display their optimum bleaching power at temperatures above 60° C. A number of organic compounds, such as tetraacetylethylenediamine (TAED), which release a peroxycarboxylic acid during the washing process with hydrogen peroxide, are described for their activation.

In addition, however, a number of peroxycarboxylic acids have also recently been described for direct use in detergents.

A problem both of the activators and of the ready-made peroxycarboxylic acids is, however, their low storage stability in alkaline detergent formulations. An adequate storage stability of these substances can be achieved by using a suitable enveloping substance.

The use of polymeric organic compounds, such as polyacrylamide, copolymers of acrylic acid, methacrylic acid or maleic anhydride and starch or cellulose ethers, as the enveloping substance is known from U.S. Pat. No. 4,009,113.

U.S. Pat. No. 4,126,573 describes granules of solid, preferably aliphatic peroxycarboxylic acids enveloped in surface-active substances (surfactants).

EP-A-272 402 mentions the use of homo- or copolymers of an unsaturated organic carboxylic acid containing 3-6 carbon atoms, for example polyacrylates, as an enveloping agent for peroxycarboxylic acid granules.

In spite of the known enveloping substances, there continues to be a need for suitable enveloping substances which guarantee an adequate storage stability of the granules, in particular in detergents, cleaning agents and disinfectants.

The invention relates to stable granules comprising the active substance, granulating auxiliary, enveloping substance and if appropriate additional components, wherein the enveloping substance in each case comprises a) silicon dioxide particles or
b) homopolymers of unsaturated sulfonic acids or
c) copolymers of unsaturated sulfonic acids and unsaturated carboxylic acids or
d) homopolymers of (meth)acrylic acid esters or
e) copolymers of (meth)acrylic acid esters and unsaturated carboxylic acids or
f) mixtures of one or more of these constituents.

The essential constituents of the granules according to the invention are
   active substance
   granulating auxiliary
   additional components and
   enveloping substance
The active substances which can be used are:
   temperature-sensitive substances
   bleaching agents and bleaching activators.

Examples of temperature-sensitive substances are enzymes, such as lipases and amylases.

Suitable bleaching agents are organic per-salts, such as perborates and percarbonates, in the presence of suitable activators.

Preferred perborates are the alkali metal perborates, in particular sodium perborate.

Suitable activators are preferably tetraacetylethylenediamine (TAED), tetraacetylmethylenediamine, tetraacetylglucoluril (TAGU), diacetyldioxohexahydrotriazine (DADHT), pentaacetylglucose (PAG), sodium acetoxybenzenesulfonate, sodium nonanoyloxybenzenesulfonate (NOBS) and sodium benzoyloxybenzenesulfonate (BOBS).

Other suitable bleaching agents are organic peracids. These include aliphatic peroxycarboxylic acids, such as 1,12-dodecanediperoxycarboxylic acid (U.S. Pat. No. 4,795,594), persuccinic acid (DE-A-34 38 529) and perglutaric acid (DE-A-35 39 036), as well as peroxycarboxylic acids containing amide groups, such as N-decanoyl-6-aminoperoxycaproic acid and 3-(N-nonylcarbamoyl)-peroxypropionic acid (EP-A-170 386), peroxy compounds of phthalic acid, such as monoperoxyphthalic acid, and peroxy compounds of phthalic acid derivatives, such as diimidoperoxycarboxylic acids.

Preferred organic peracids are imidoperoxycarboxylic acids of the formula $$\begin{array}{c} O \\ \parallel \\ C \\ A \diagup \phantom{x} \diagdown \\ \phantom{A\diagup} N-X-C-OOM \\ \diagdown \phantom{x} \diagup \phantom{xxx} \parallel \\ C \phantom{xxxxxx} O \\ \parallel \\ O \end{array}$$

in which A is a group of the formulae $$R^1 \diagdown CH-(CH_2)_n-CH \diagup R^2 \diagup \;,\; R^1 \diagdown C=C \diagup R^2 \diagup \;,\; \text{(substituted benzene with } R^1, R^2\text{)}$$

or (cyclohexyl-fused) or (phthalimido-type) $N-X-\overset{O}{\underset{\parallel}{C}}-OOM$ n is the number 0, 1 or 2, $R^1$ is hydrogen, chlorine, bromine, $C_1$–$C_{20}$-alkyl, $C_1$–$C_{20}$-alkenyl, aryl, preferably phenyl, or alkylaryl, preferably $C_1$–$C_4$-alkylphenyl, $R^2$ is hydrogen, chlorine, bromine or a group of the formula $-SO_3M$, $-CO_2M$ or $-OSO_3M$, M is hydrogen, an alkali metal ion or an ammonium ion or the equivalent of an alkaline earth metal ion and X is $C_1$–$C_{19}$-, preferably $C_3$–$C_{11}$-alkylene, or arylene, preferably phenylene.

Particularly preferred compounds of this formula are those in which
   A is a group of the formula $-CH_2-(CH_2)_n-CH_2-$, $-CH_2-CHR^1-$ or

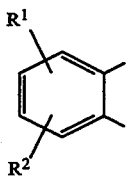

n is the number 0 or 1,
$R^1$ is hydrogen, $C_1-C_{20}$-alkyl or $C_1-C_{20}$-alkenyl,
$R^2$ is hydrogen or $CO_2M$,
X is $C_3-C_{11}$-alkylene and
M is hydrogen, an alkali metal ion or an ammonium ion or the equivalent of an alkaline earth metal ion.

Examples of such preferred compounds are ε-phthalimidoperoxyhexanoic acid (PAP), ε-[dodecylsuccinimido]peroxyhexanoic acid, γ-phthalimidoperoxybutyric acid and ε-trimellitimidoperoxyhexanoic acid, and salts or mixtures thereof.

The abovementioned imidoperoxycarboxylic acids are already known and are described in more detail in EP-A-349 940.

Peroxysulfonic acids such as are known from U.S. Pat No. 4,536,313 are also suitable. These include, in particular, sulfonylperoxycarboxylic acids, such as 4,4'-sulfonyldiperoxycarboxylic acid, 3,3'-sulfonyldiperoxybenzoic acid, 4-methylsulfonylperoxybenzoic acid and 3-decylsulfonylperoxypropionic acid.

The bleaching agents and activators employed in the granules according to the invention are normally solids at room temperature, having a melting point above 60° C. They can be employed for the granulation in powder form or in the dry or damp state.

The content of organic peracids in the granules is at least 5, preferably 20–90, particularly preferably 40–70% by weight.

The content of per-salts in the granules is 80–99% by weight.

The content of bleaching activators in the granules is in the range from 70–99% by weight.

The granulation auxiliaries have the task of forming the basic matrix of the actual granules by agglomeration with the active substance. The granulation auxiliaries used g, according to the invention can be classified in two groups:

inorganic sulfates and/or phosphates,
organic compounds having surface-active properties (surfactants).

Suitable inorganic sulfates/phosphates are sulfates/phosphates of alkali metal or alkaline earth metals which are readily soluble and give a neutral or acid reaction after dissolving. Compounds which are preferably used are sodium sulfate, sodium hydrogen sulfate, potassium sulfate, potassium hydrogen sulfate, sodium dihydrogen sulfate or magnesium sulfate. Mixtures of these acids furthermore can be employed.

Surface-active substances which are preferably employed are water-soluble, anionic sulfates or sulfonates or switter-ionic surfactants. Examples of such compounds are alkali metal or alkaline earth metal salts of alkyl-sulfates or -sulfonates having an alkyl group of 9 to 22 carbon atoms, which are obtained from naturally occurring or synthetically prepared fatty alcohols or from hydrocarbons, such as paraffin. Other useful surfactants which can be used are salts of alkylbenzenesulfonates, in which the alkyl group contains 9 to 22 carbon atoms and can be branched or unbranched. All the compounds mentioned can optionally carry ethoxylated groups in the molecule. Preferred compounds are secondary alkanesulfonates (®Hostapur SAS), alkyl-sulfates and alkylbenzenesulfonates.

The granulating auxiliaries can be employed for the granulation in solid or pasty form or in the form of a solution. The preferred solvent in this case is water. Mixtures of the granulating auxiliaries of the "inorganic sulfates and/or phosphates" group can be employed for the granulation in any ratio with those of the "surfactants" group.

The proportion of granulating auxiliary in the granules according to the invention is 5 to 60, preferably 20 to 50% by weight, particularly preferably 30 to 40% by weight.

In some cases, it may be desirable for the granules to contain certain additional components. Examples of these are chelating systems, dyestuffs and agents for regulating the pH.

It is known that metals are capable of catalytically decomposing organic or inorganic per-compounds. To overcome this problem, up to 3% by weight of a chelating agent can be added to the granules. Preferred compounds are inorganic or organic phosphates or phosphonates or aminomethylenecarboxylic acids. Examples of these are ethylenediaminetetramethylenephosphonic or -carboxylic acids or diethylenetriaminepentamethylenephosphonic acid or salts thereof.

Agents for adjusting the pH are employed to modify or maintain the pH within the granules. Examples of these are citric acid, fatty acid or succinic acid or salts, such as silicates, phosphates or sodium bisulfate.

The granules according to the invention can comprise individual substances of the abovementioned active substances, granulating auxiliaries and additional components or mixtures thereof.

The enveloping substances employed are in each case
a) colloidal silicon dioxide particles or
b) homopolymers of unsaturated sulfonic acid or
c) copolymers of unsaturated sulfonic acids and unsaturated carboxylic acids or
d) homopolymers of (meth)acrylic acid esters or
e) copolymers of (meth)acrylic acid esters and unsaturated carboxylic acids or
f) mixtures of one or more of these constituents.

a) The granules according to the invention having silicon dioxide particles as the enveloping substance are obtainable by application of an aqueous dispersion of colloidally disperse silicon dioxide particles. Aqueous dispersions of colloidally disperse silicon dioxide particles which are used for preparation of the enveloping substance according to the invention include, preferably, so-called silica sols such as are known from Ralph K. Iler, The Chemistry of Silica, John Wiley and Sons, New York, 1979. The preparation and properties of these silica sols are dealt with in Chapter 4, pages 312 to 461. Such silica sols are obtainable under the name ®Klebosol (trademark of Société Française Hoechst) and are described in the brochure from Société Française Hoechst "Klebosol, sols de silice—silicia sols—Kieselsol". The silica sols are preferably applied to the granules in a concentration of 1 to 60% by weight.

b) The homopolymers of unsaturated sulfonic acids comprise the monomers vinylsulfonic acid, styrenesulfonic acid, 2-acrylamido-2-methylpropanesulfonic acid and/or salts thereof, vinylsulfonic acid being the preferred monomer. The homopolymers have an average molecular weight ($\overline{M}_w$) of 3,000 to 100,000 and are preferably applied to the granules as an aqueous solution having a concentration of 1 to 60% by weight.

c) The copolymers of unsaturated sulfonic acid and unsaturated carboxylic acids comprise 3–97% by weight of an unsaturated sulfonic acid and
97–3% by weight of an unsaturated carboxylic acid.

Suitable monomers of the unsaturated sulfonic acids are vinylsulfonic acid, styrenesulfonic acid, 2-acrylamido-2-methylpropanesulfonic acid and/or salts thereof, vinylsulfonic acid being the preferred monomer. Acrylic acid, methacrylic acid, maleic acid, fumaric acid and/or itaconic acid and salts thereof are usually employed as the unsaturated carboxylic acids. The compounds have an average molecular weight ($\overline{M}_w$) of 800 to 2,000,000, preferably 2,000 to 50,000. The copolymers are preferably applied to the granules in aqueous solution.

The concentration of the solution is 1 to 60% by weight, preferably 10 to 30% by weight. However, it is important for the pH of the aqueous polymer solution to be, or to be adjusted to, between 2.5 and 7. The pH can be adjusted by addition of acids which are not volatile at room temperature, such as benzoic acid, to the polymer solution. However, it is also conceivable that the non-volatile acid is already added during the preparation of the copolymer and is incorporated as a further monomer. The content of non-volatile acid is usually up to 10% by weight.

d) The homopolymers of (meth)acrylic acid esters have an average molecular weight ($\overline{M}_w$) of 1,000 to 2,000,000% by weight and are preferably applied to the granules in aqueous solution in a concentration of 1 to 60% by weight, particularly preferably 30% by weight.

e) The copolymers of (meth)acrylic acid esters and unsaturated carboxylic acids comprise 3 to 50% by weight, preferably 5 to 15% by weight, of a (meth)acrylic acid ester, preferably a (meth)acrylic acid $C_1$–$C_8$-alkyl ester, and 97 to 50% by weight, preferably 95 to 85% by weight, of an unsaturated carboxylic acid, preferably acrylic acid, methacrylic acid, maleic acid, fumaric acid, itaconic acid and/or salts thereof. The copolymers have an average molecular weight of 1,000 to 2,000,000 and are usually applied to the granules as an aqueous solution in a concentration of 1 to 60% by weight. It has been found that the addition of (meth)acrylic acid esters has advantageous effects on the use of the copolymers as an enveloping substance. By increased incorporation of acrylic acid, salts thereof and/or esters thereof into the copolymers, their glass transition point, that is to say their melting or solidification range, is lowered. It is said that the polymer becomes "softer".

The incorporation of methacrylic acid, salts thereof and/or esters thereof into the copolymers increases the glass transition point. The copolymer becomes "harder". The molecular weight of the copolymer and the cation of the particular salt furthermore have an influence on the glass transition point of the copolymer. It can be demonstrated that as the molecular weight of the copolymer increases, its glass transition point also rises, and that by incorporation of cations of the quaternary ammonium ion, $NH_4^+$, $K^+$ $Na^+$, the glass transition point of the copolymer is increased. It is thus possible to adjust the glass transition point of the copolymers to a particular temperature range.

The enveloping substances a) to e) are in general employed individually. If required, mixtures of the enveloping substances a) to e) can also be employed. Mixtures which comprise enveloping substances b) to e) in an equal weight ratio are preferably employed.

The homo- and copolymers of groups b) to e) are obtained by customary processes of precipitation and solution polymerization.

For preparation of the granules according to the invention, the active substance and the granulating auxiliary are mixed in a first step such that suitable granules are formed by agglomeration. This can be effected in a kneader, mixer or extruder or a pelleting machine. Possible mixers are those which can be operated batchwise or continuously. Examples of such batch mixers are "Dry Dispenser"• (Baker, Perkins, Peterborough, GB),
"Diosna-Pharmamix"• (Diercks, Osnabrück, DE),
"Matrix"• ( Fielder Ltd., Eastlake, GB),
"Baumeister"• (Ruberg, Paderborn, DE),
"Ruberg Hochleistungsmischer"• (Ruberg, Paderborn, DE),
"MTI, Typ EM"• (MTL, Detmold, DE) and
"Eirich Mixers"• (Eirich Hardheim, DE).
"Lödige Pflugscharmischer"• (Lödige Maschinenfabrik, Paderborn)
"Lödige Recycler CB"• (Lödige Maschinenfabrik, Paderborn).

An example of a continuously operated mixer which may be mentioned is the
"Konax Durchlaufmischer"• (Ruberg, Paderborn, DE).

Examples of extruders are "Alma"•, "Unica"•, "Xtruder"• and "Werner Pfleiderer"•.

Examples of customary pelleting machines are the products from Simon Heesen or the Maromarizer from Russel Finings Ltd., London, GB. Other apparatuses which can be employed for preparation of the low-dusting granules by the process according to the invention are fluidized bed mixers in which different temperature levels can be established.

A kneader is appropriate in all instances where intensive mechanical mixing is necessary due to addition of a pasty granulating auxiliary. If the mixing is carried out in a kneader, for example a Srabender kneader, it has proved advantageous for the resulting material also additionally to be compacted in a granulator, for example an Eirich granulator. If inorganic hydratable salts are used as granulating auxiliaries, it is advantageous to employ the active substance with a water content of 50 to 5, preferably 35 to 20% by weight. In this case, the mixing can be carried out, for example, in a Lödige mixer. The granules thus obtained require no further compaction after drying. Granules having a particle size of 0.5 to 2 mm are usually aimed for. This can be achieved by sieving the granules. The proportion of useful particles is in general 80%. The contents above or below can be recycled to the granulating process. The aqueous solution of the enveloping substance is applied in a second step to the granules thus prepared. To obtain as complete a coating as possible, the granules must be agitated during application of the solution,. Application is usually effected by spraying on, but it can also be effected by passing in a jet, dropwise addition, addition via a distributor rake, addition via a distributor weir or other measures known to the expert. A particularly preferred form is spraying on in a fluidized bed. In this procedure, the coated granules can be dried at the same time by heating the fluidizing air. Spraying on is carried out such that further agglomeration is prevented. The particle size and particle size distribution are therefore influenced only insignificantly by the enveloping process.

Further, chelating agents, dyestuffs and agents for regulating the pH can additionally be dissolved in the aqueous polymer solution. The enveloped granules must also be dried, depending on the spraying process.

The granules according to the invention are white, free-flowing granules having a bulk density of between and 1200 kg/m³, preferably between 500 and 800 kg/m³.

After-treatment, for example pressing to tablets or larger agglomerates, is possible and is appropriate for particular intended uses.

Experimental part

I. Enveloping substances employed a) Klebosol• 1344 H (type A) and Klebosol• 1345 H (type B)

These are acid-stabilized silicon dioxide dispersions which have a pH of 3.0 as a 1% strength by weight solution. The two different types A and B differ merely in their specific surface area. The silicon dioxide dispersions are sprayed onto the granules as an approximately 30% strength by weight solution.

b) Polyvinylsulfonic acid

The polyvinylsulfonic acid employed has an average molecular weight of $M_w=14000$ and is sprayed onto the granules as a 25.5% strength by weight aqueous solution. The pH of a 1% strength by weight aqueous solution is 4.2.

e) Copolymer Type A

Copolymer Type A of
15.7% by weight of methacrylic acid
60.3% by weight of butyl acrylate and
24.0% by weight of methyl methacrylate
has an average molecular weight ($\overline{M}_w$) of approximately 200,000. The pH of a 1% strength by weight aqueous solution is 3.1. The copolymer is sprayed on as a 34% strength by weight aqueous solution.

Copolymer Type B

Copolymer Type B of
60.7% by weight of butyl acrylate,
24.2% by weight of methyl methacrylate,
11.8% by weight of methacrylic acid and
3.3% by weight of acrylic acid
has an average molecular weight ($\overline{M}_w$) of approximately 50,000. The pH of a 1% strength by weight aqueous solution is 3.3. The copolymer is sprayed on as a 29% strength by weight aqueous solution.

II. General preparation instructions 1200 g of dry ε-phthalimidoperoxycaproic acid, 500 g of water and 350 g of anhydrous sodium sulfate are mixed in a 2.5 l Lödige mixer at 140 revolutions per minute for 10 minutes and the product is then dried to constant weight in a vacuum drying cabinet at 40° C. After sieving, 90% of a useful particle fraction of between 200 and 2000 μm is obtained.

450 g of the previously obtained useful particle fraction are initially introduced into a fluidized bed unit (fluidized bed unit from Aeromatic/Switzerland, model: STREA-1) and fluidized by a stream of air, warmed to 28° C. of about 50 m³/h As soon as a stable fluidized bed has formed, an aqueous solution of the enveloping substance is applied through a nozzle incorporated in the apparatus. The amount of solution is chosen such that granules covered with 9.1% of enveloping substance are formed. The finished granules result after drying in a vacuum drying cabinet at 40° C. and renewed sieved removal of a useful particle fraction of between 200 and 2,000 μm.

III. EXAMPLES

Example 1

Granules enveloped with copolymer type A have the following composition: 68% of ε-phthalimidopercaproic acid (corresponding to an active oxygen content of 3.92%), 21.4% of sodium sulfate, 9.1% of copolymer type A, 0.8% of water.

Example 2

Granules enveloped with copolymer B have the following composition: 69.5% of ε-phthalimidopercaproic acid (corresponding to an active oxygen content of 4.01%), 20.4% of sodium sulfate, 9.1% of copolymer type B, 0.5% of water.

Example 3

Granules enveloped with •Klebosol type A have the following composition: 68.6% of ε-phthalimidopercaproic acid (corresponding to an active oxygen content of 3.96%), 20.9% of sodium sulfate, 9.1% of •Klebosol type A, 1.1% of water.

Example 4

Granules enveloped with •Klebosol type B have the following composition: 66.8% of ε-phthalimidopercaproic acid (corresponding to an active oxygen content of 3.85%), 22.7% of sodium 2,5 sulfate, 9.1% of •Klebosol type B, 1.0% of water.

Example 5

Granules enveloped with polyvinylsulfonic acid have the following composition: 69.4% of ε-phthalimidopercaproic acid (corresponding to an active oxygen content of 4.0%), 19.6% of sodium sulfate, 9.1% of polyvinylsulfonic acid, 1.7% of water.

Comparison

For comparison, the granules according to the invention are tested against granules enveloped with polyacrylic acid and having the following composition: 70.5% of ε-phthalimidopercaproic acid (corresponding to an active oxygen content of 4.07%), 18% of sodium sulfate (sulfate determination by the barium chloride method), 10% of polyacrylic acid and 0.5% of water (determination of water by the Karl Fischer method).

IV. Use Experiments

Storage Experiments

Storage stability at 38° C.

The granules are stored in a drying cabinet at a controlled temperature of 38° C. in glass bottles, the lids of which remain slightly open. Samples of the granules are taken approximately weekly, their active oxygen content is determined and the result is expressed in relation to the starting value.

| Granules | Storage time | | | | |
| --- | --- | --- | --- | --- | --- |
|  | 7 days | 14 days | 21 days | 28 days | 46 days |
| Example 1 | 99% | 99% | 97% | 97% | 96% |
| Example 2 | 99% | 98% | 96% | 96% | 95% |

-continued

| | Storage time | | | | |
|---|---|---|---|---|---|
| Granules | 7 days | 14 days | 21 days | 28 days | 46 days |
| Example 3 | 99% | 99% | 99% | 95% | 93% |
| Example 4 | 99% | 99% | 99% | 99% | 99% |
| Example 5 | 99% | 97% | 97% | 96% | 96% |
| Comparison | 99% | 98% | 98% | 96% | 95% |

Storage stability at 38° C. and 80% atmospheric humidity The granules are stored in a climatically controlled cabinet at 38° C. and an atmospheric humidity of 80% in open crystallizing dishes. Samples are taken at intervals of several days over a test period of more than 4 weeks, the content of active oxygen is determined and the result is expressed in relation to the starting value.

| | Storage time | | | | |
|---|---|---|---|---|---|
| Granules | 4 days | 10 days | 18 days | 24 days | 31 days |
| Comparison | 99% | 97% | 95% | 95% | 94% |
| Example 2 | 98% | 96% | 94% | 94% | 94% |
| Example 3 | 93% | 92% | 92% | 90% | 89% |
| Example 4 | 98% | 97% | 96% | 96% | 94% |
| Example 5 | 99% | 97% | 94% | 93% | 91% |
| Comparison | 98% | 97% | 95% | 94% | 92% |

Abrasion test

The abrasion is determined as falling abrasion using an apparatus from Erweka, Heusenstamm (Germany), type TARD. For this, 10 g of granules are introduced into a rotary drum together with three steel balls (diameter 7 mm), and the drum is turned at 40 revolutions/minute for 30 minutes. The particle size distribution is then determined via sieve analysis.

| | Particle size | | | |
|---|---|---|---|---|
| Granules | 1.0 mm | 0.8 mm | 0.6 mm | >0.2 mm |
| Comparison | 20% | 15% | 12% | 53% |
| Example 2 | 51% | 15% | 8% | 26% |
| Example 3 | 62% | 16% | 6% | 16% |

It is found that enveloping substances of the type a), b) and e) are particularly suitable for enveloping active compounds, specifically peracid granules. The peracid granules according to the invention all have an excellent storage stability and are also storage-stable under conditions similar to those in practice. The enveloping materials claimed moreover are distinguished by additional advantages. Thus, for example, the glass transition point of the homo- and copolymers of (meth)acrylic acid esters and unsaturated carboxylic acids can be varied within a wide range, depending on the composition of the polymers, and the "hardness/softness" of the polymers can thus be adjusted. As a consequence, the abrasion of granules enveloped with these substances can be reduced. The dispersions of colloidally dispersed silicon dioxide particles (*KLEBOSOL) thus provide enveloping substances which are of interest as "natural" enveloping material in particular from the ecological aspect.

We claim:

1. Stable granules comprising an active substance, a granulating auxiliary, and, enveloping the granules, an enveloping substance, wherein the enveloping substance comprises the following constituents
   a) silicon dioxide particles or
   b) a homopolymer of an unsaturated sulfonic acid and/or salt thereof or
   c) a copolymer of an unsaturated sulfonic acid and/or salt thereof and an unsaturated carboxylic acid and/or salt thereof or
   d) a homopolymer of an acrylic or methacrylic acid ester or
   e) a copolymer of an acrylic or methacrylic acid ester and an unsaturated carboxylic acid and/or salt thereof or
   f) mixtures of one or more of these constituents.

2. Stable granules as claimed in claim 1, wherein colloidal silicon dioxide particles are employed as the enveloping substance.

3. Stable granules as claimed in claim 1, wherein said enveloping substance comprises silicon dioxide particles, and said silicon dioxide particles have been applied to the granules in the form of a 1 to 60% strength by weight aqueous silica sol.

4. Stable granules as claimed in claim 1, wherein a homopolymer of an unsaturated sulfonic acid has been included in the enveloping substance.

5. Stable granules as claimed in claim 4, wherein the homopolymer has an average molecular weight ($\overline{M}_w$) of 3,000 to 100,000.

6. Stable granules as claimed in claim 1, wherein a homopolymer of an unsaturated sulfonic acid has been applied to the granules in the form of a 1 to 60% strength by weight aqueous solution.

7. Stable granules as claimed in claim 1, wherein a copolymer of the monomers comprising an unsaturated sulfonic acid and/or salt thereof and an unsaturated carboxylic acid and/or salt thereof has been included in the enveloping substance.

8. Stable granules as claimed in claim 7, wherein the copolymer has an average molecular weight ($\overline{M}_w$) of 800–2,000,000 and comprises
   3–97% by weight of an unsaturated sulfonic acid and/or salt thereof
   97–3% by weight of an unsaturated carboxylic acid and/or salt thereof and
   0–10% by weight of a non-volatile acid.

9. Stable granules as claimed in claim 1, wherein the enveloping substance comprises a copolymer of an unsaturated sulfonic acid and an unsaturated carboxylic acid in the form of a 1 to 60% strength by weight aqueous solution having a pH of less than 7.

10. Stable granules as claimed in claim 1, wherein said enveloping substance comprises a homopolymer of a methacrylic or acrylic acid ester having an average molecular weight of 1,000 to 2,000,000.

11. Stable granules as claimed in claim 1, wherein a homopolymer of a methacrylic or acrylic acid ester has been applied to the granules in the form of a 1 to 60% strength by weight solution.

12. Stable granules as claimed in claim 1, wherein said enveloping substance comprises a copolymer of a methacrylic or acrylic acid ester and an unsaturated carboxylic acid or salt thereof.

13. Stable granules as claimed in claim 12, wherein the copolymer comprises
   3–50% by weight of a methacrylic or acrylic acid ester and
   97–50% by weight of an unsaturated carboxylic acid and has an average molecular weight of 1,000 to 2,000,000.

14. Stable granules as claimed in claim 12, wherein the copolymer of a methacrylic or acrylic acid ester and an unsaturated carboxylic acid has been sprayed on in the form of a 1 to 60% strength by weight solution.

15. A bleaching agent, oxidizing agent and disinfectant comprising granules as claimed in claim 1.

16. Detergents, cleaning agents and disinfectants comprising granules as claimed in claim 1.

17. Stable granules as claimed in claim 1, wherein a silica sol has been included in the enveloping substance.

18. Stable granules as claimed in claim 1, wherein a polyvinylsulfonic acid has been included in as enveloping substance.

19. Stable granules as claimed in claim 1, wherein a copolymer of a vinylsulfonic acid and acrylic acid, methacrylic acid, maleic acid, fumaric acid and/or itaconic acid or a salt thereof has been included in the enveloping substance.

20. Stable granules as claimed in claim 8, wherein the non-volatile acid is benzoic acid.

21. Stable granules as claimed in claim 1, wherein a copolymer of an unsaturated sulfonic acid and an unsaturated carboxylic acid has been applied to the granules in the form of a 10–30% strength by weight aqueous solution having a pH between 2.5 and 7.

22. Stable granules as claimed in claim 1, wherein a copolymer of a methacrylic acid ester and acrylic acid, methacrylic acid, maleic acid, fumaric acid and/or itaconic acid or a salt thereof has been included in enveloping substance.

23. Stable granules as claimed in claim 12, wherein the copolymer comprises
   5–15% by weight of a methacrylic or acrylic acid ester and
   95–85% by weight of an unsaturated carboxylic acid and has an average molecular weight of 1,000 to 2,000,000.

24. Stable granules as claimed in claim 12, wherein the copolymer comprises
   3–50% by weight of a methacrylic or acrylic acid $C_1$–$C_8$-alkyl ester and
   97–50% by weight of an unsaturated carboxylic acid and has an average molecular weight of 1,000 to 2,000,000.

25. Stable granules as claimed in claim 12, wherein the copolymer comprises
   5–15% by weight of a methacrylic or acrylic acid $C_1$–$C_8$-alkyl ester and
   95–85% by weight of an unsaturated carboxylic acid and has an average molecular weight of 1,000 to 2,000,000.

26. A method for enveloping granules comprising an active substance and a granulating auxiliary, comprising the step of applying to said granules an aqueous dispersion of colloidally dispersed silicon dioxide particles, a homopolymer of an unsaturated sulfonic acid and/or salt thereof, a copolymer of an unsaturated sulfonic acid and/or salt thereof and an unsaturated carboxylic acid and/or salt thereof, a homopolymer of a methacrylic or acrylic acid ester and/or a copolymer of a methacrylic or acrylic acid ester and an unsaturated carboxylic acid and/or salt thereof.

* * * * *

UNITED STATES PATENT AND TRADEMARK OFFICE
CERTIFICATE OF CORRECTION

PATENT NUMBER: 5,419,846

DATED: May 30, 1995

INVENTOR(S): Frank Jaekel, Gerd Reinhardt, Gerhard Nöltner, Eric Jacquinot, Rüdiger Funk and Manfred Müller It is certified that errors appear in the above-identified patent and that said Letters Patent is hereby corrected as shown below:

In column 3, at line 25, "Pat No." should read --Pat. No.--.

In column 3, at line 45, "g," should be deleted.

In column 3, at the end of line 50, the hyphen "-" should be deleted.

In column 5, line 16, please delete the comma after the number "2,000,000".

In column 5, at line 32, please delete "% by weight".

In column 5, at line 63, the word --or-- should be inserted between $K^+$ and $Na^+$.

In column 6, at the end of line 59, the comma "," should be deleted.

In column 7, at the beginning of line 9, --300-- should be inserted before "and 1200".

In column 7, at line 65, before the word "As" a period should be inserted.

UNITED STATES PATENT AND TRADEMARK OFFICE
CERTIFICATE OF CORRECTION

PATENT NUMBER: 5,419,846

DATED: May 30, 1995

INVENTOR(S): Frank Jaekel, Gerd Reinhardt, Gerhard Nöltner, Eric Jacquinot, Rüdiger Funk and Manfred Müller It is certified that errors appear in the above-identified patent and that said Letters Patent is hereby corrected as shown below:

In column 8, at line 34, please delete "2,5".

In column 9, at line 11, prior to the word "The" a period --.-- should be inserted.

Signed and Sealed this

Twenty-sixth Day of December, 1995

Attest:

BRUCE LEHMAN

*Attesting Officer*  *Commissioner of Patents and Trademarks*